Dec. 30, 1969    J. W. C. GATES    3,487,331
Q-SWITCHED LASER LIGHT SOURCES
Filed May 9, 1966    2 Sheets-Sheet 1

Dec. 30, 1969    J. W. C. GATES    3,487,331
Q-SWITCHED LASER LIGHT SOURCES

Filed May 9, 1966    2 Sheets-Sheet 2

INVENTOR
JOHN WILLIAM CHARLES GATES

By Cushman, Darby & Cushman
ATTORNEYS

United States Patent Office 3,487,331
Patented Dec. 30, 1969

3,487,331
Q-SWITCHED LASER LIGHT SOURCES
John William Charles Gates, Teddington, Middlesex, England, assignor to National Research Development Corporation, London, England, a body corporate
Filed May 9, 1966, Ser. No. 548,545
Claims priority, application Great Britain, May 13, 1965, 20,258/65
Int. Cl. H01s 3/10
U.S. Cl. 331—94.5
10 Claims

ABSTRACT OF THE DISCLOSURE

A Q-switched laser in which pulses of output radiation are produced by sudden increases in the quality factor (Q) of a resonant reflecting structure of a laser cavity after the establishment of a strongly inverted population distribution in the laser material. The laser arrangement includes an afocal magnifying optical system disposed within the resonant cavity in an optical path between the body of the laser material and a movable reflector.

---

Figure 1:
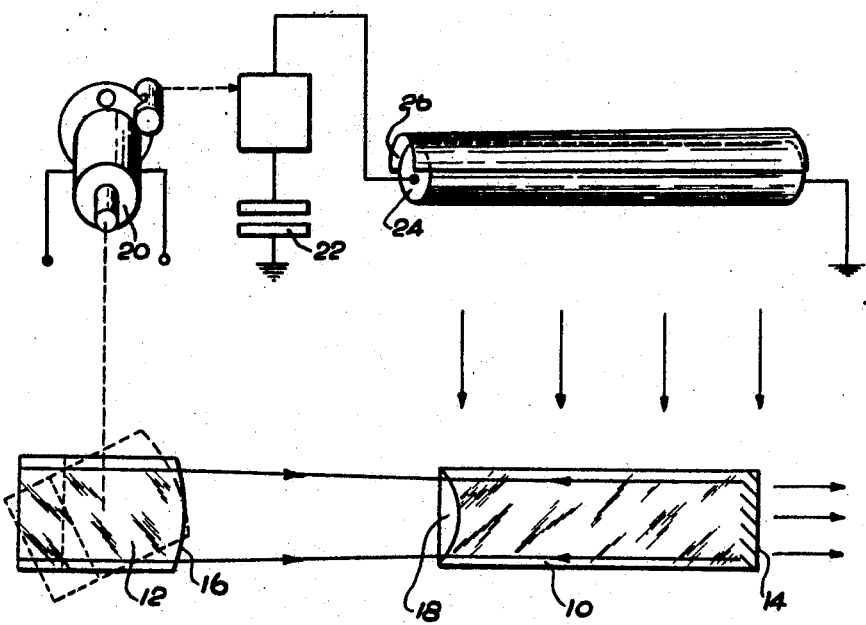

The invention relates to the light source, known as the "Q-switched laser," in which large pulses of monochromatic light are produced by sudden increase in the quality factor (Q) of a resonant cavity immediately after a maximum population inversion has been attained in the laser material between a normal and a higher energy state.

The required change in Q is conventionally produced by rapidly rotating one of two reflectors bounding the resonant cavity about an axis perpendicular to the direction of the emission and in phase with the pumping of the laser medium, so as to bring the mirror into the position giving maximum Q immediately after the attainment of maximum inversion.

The optimum rate of switching is governed by the transit time of light within the resonant cavity and the practical difficulty of driving the mirror generally restricts the available speed of rotation, and hence the maximum peak power output at each pulse, to a value substantially below the optimum, although the ultimate permissible speed of rotation is only limited by the incurrance of mechanical distortion and the risk of failure in the mirror and its mounting under rotational forces.

The maximum peak power can also be limited by the risk of damage to the reflector by excessive power density.

The invention is concerned with optical arrangement by which these practical limitations on the maximum peak power output of a Q-switched laser can be extended, without necessarily introducing any additional optical components or increasing the number of reflecting and transmitting surfaces.

In accordance with the invention an afocal magnifying system is introduced into the resonant cavity in front of the rotating reflector of a Q-switched laser. If the system has a magnification $m$ both the rate of angular sweep of the reflected beam and the linear aperture of the reflector filled by the beam will be increased by the same factor $m$. For a given rate of rotation the apparent rate of rotation, and hence the rate of Q switching will be increased $m$-fold and, for a given flux the intensity of illumination on the reflector will be reduced by a factor $1/m^2$ by the introduction of the afocal system.

Increase in linear aperture calls for an increase in dimensions which will result in multiplying the rotational forces by a factor $m^2$ for a given speed of rotation, but a given rate of Q switching can be attained with a speed of rotation reduced by $1/m$. This reduction in rotational speed results in a reduction by $1/m^2$ in the rotational forces so that a given Q switching rate can be attained without increasing rotational forces and accordingly the ultimate limit on the rate of Q switching imposed by these forces is unaffected, although the practical limit imposed by the driving requirements is raised $m$-fold.

An afocal optical system comprising the two lenses of a Galilean telescope can be introduced between the ruby rod and the rotating roof prism of a typical Q-switched laser. However, it is not necessary to introduce additional components; the optical surfaces can be formed on the roof prism and ruby rod respectively.

In order that the invention may be more thoroughly understood a Q-switched laser in accordance with it and some of the possible modifications thereof will be described in some detail, by way of example, with reference to the accompanying drawing, in which:

FIGURE 1 is a diagram showing the relevant parts of a typical Q-switched laser in accordance with the invention; and FIGURES 2 through 5 illustrate possible modifications to the afocal optical system.

FIGURE 1 illustrates a Q-switched laser, including a ruby rod 10 and a rotating roof prism 12 of silica. The end of the rod 10 remote from the prism 12 carries a coating 14 with a reflectivity of about 50%.

The positive element of a Galilean afocal telescope system is incorporated in the rotating prism 12 by the formation of a convex curvature on the entrance (refractive) face 16. The negative component takes the form of a strongly curved concave end surface 18 on the rod 10, coated to reduce reflection.

The prism is mounted directly on the shaft of a synchronous motor 20 driven from a single phase A.C. mains supply and the mains waveform is used to phase the pumping flash from a conventional capacitor bank 22 and flash tube light source 24. The flash tube is associated with an elliptical cylinder reflector 26.

With a ruby rod 100 mm. long and 10 mm. diameter with a concave end surface 18 of radius of curvature 21.6 mm. associated with a silicon prism 12 with an entrance face 16 about 20 mm. clear aperture and a convex spherical curvature of radius 91 mm. giving an effective magnification of 7.8, driven at 3000 r.p.m., and a 130 mm. long flash tube 24 powered by a capacitor bank delivering 1000 Joules at each flash, the observed laser output consisted of typical "giant pulse" spikes of peak power from 0.5 to 0.7 mw. and a total duration of about 2 microseconds. Much higher motor speeds are readily available in practice and with appropriate magnification in the afocal system it should be possible to realise the maximum rate of Q switching permitted by the rotational forces in the reflector.

In addition to the magnification of rotational speed and the reduction in peak power density in the reflection prism resulting from the introduction of the afocal system the formation of the laser rod 10 with a divergent face 18 helps to minimise the risk of the maximum peak power output being limited by an accidental resonant structure, independent of the rotating prism 12, and possibly with a lower Q, drawing off some or all of the available energy before the prism comes into position. The effect of the divergent face 18 of the rod 10 is to make any competing non-Q-switched resonant structure much more "lossy" and less likely to sustain oscillation.

Many variations of the arrangement of the essential optical elements: first (typically negative) lens; rotating reflector; second (typically positive) lens and erecting reflector(s) are possible in accordance with the invention. Four such variations are illustrated in FIGURES 2 to 5.

Figure 2:
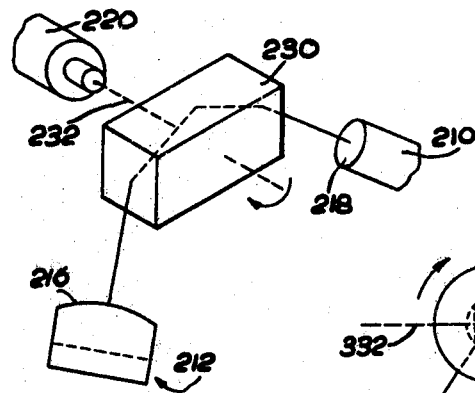

FIGURE 2 shows an arrangement in which the rotating reflector is separated from the positive lens of the Galilean system and the erecting elements. As in the arrangement of FIGURE 1 the negative lens of Galilean telescope is formed at the end face 218 of a ruby rod 210 and the positive lens on the front face 216 of a roof prism 212, but, unlike the prism 12 the prism 212 is fixed and the rotating reflector takes the form of a plane mirror or (as shown) a rectangular block 230 coupled to an electric motor 220 so as to rotate about the transverse axis 232. The block 230 is so disposed with respect to the ruby rod 210 and the fixed roof prism 212 that the light beam undergoes Brewster angle refraction at the two end faces of the block, at the critical instant during each revolution when total internal reflection occurs at one of the four side faces.

The axis of rotation 232 is transverse to the rectangular reflector block 230 and parallel to the plane of incidence. The block could alternatively be mounted to rotate about its longitudinal axis. Arrangements for so mounting are illustrated diagrammatically in FIGURES 3 and 4.

Figure 3:
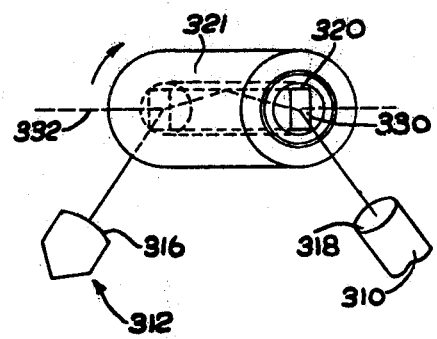

FIGURE 3 shows a rectangular glass block reflector 330 mounted within the cylindrical hollow rotor 320 of an air turbine having a coaxial cylinderical stator 321. The block 330 receives light from the concave end face 318 of a ruby rod 310 at one end face which is refracted at the Brewster angle at the critical instant in each revolution when total internal reflection takes place at one of the four side faces as the block is rotated about the axis 332 of the turbine rotor 320 and delivers it from the other end face to the fixed roof prism 312 with it convex front face 316, to receive it once more and return it by the same path to the rod 310.

The rotor 320 and stator 321 could alternatively be the components of an electric motor.

Figure 4:
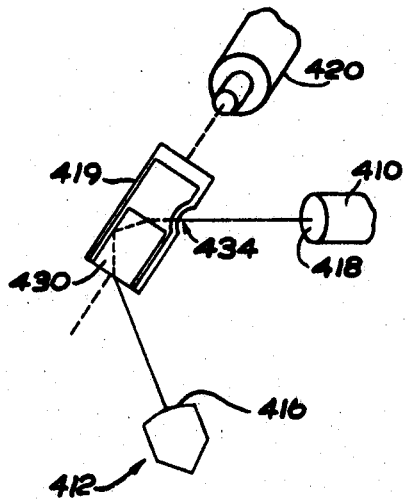

FIGURE 4 shows another form of the same drive system. Here an electric motor 420 is coupled to a housing 419 in one end of which the block 430 is mounted, to receive at one end face light from the concave face 418 of the ruby rod 410. The optical path is, as before, completed by a roof prism 412 with convex front face 416.

Figure 5:
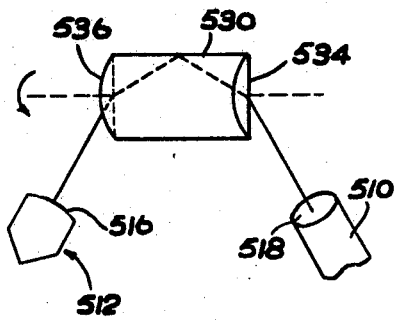

It is possible to distribute the focusing power between components of the system. FIGURE 5 shows the optical layout of a system which could be mechanically similar to those of FIGURES 3 and 4. Here the end faces 534 and 536 of a rotatably mounted glass block 530 are both optically active, being respectively concave and convex. The concavity of the face 534 augments the optically dispersive effect of the concave face 518 of the ruby rod 510, and the convexity of the face 536 augments the collective, focusing, effect of the convex front face 516 of the fixed roof prism 512. The curvature of the end faces 534, 536 can be chosen in relation to the curvature of the light wave front to approximate to the aplanatic conditions thereby to control optical aberrations.

Rectangular blocks are shown at 230, 330, 430 and 530, but polygonal prismatic blocks may be used if required, as may other rotatable or intermittant reflectors.

I claim:

1. A laser light source comprising: a body of laser material capable of population inversion between a normal and a higher energy state; pumping means for attaining a population inversion in the laser material; two reflectors arranged to define a resonant cavity about the laser material; means for rapidly moving one of the reflectors in such manner as to produce a sudden increase in the "Q" of the resonant cavity immediately after a maximum population inversion has been attained in the laser material; and characterised by an afocal magnifying optical system disposed within the resonant cavity in an optical path between the body of laser material and the movable reflector.

2. A laser according to claim 1, in which the afocal magnifying optical system comprises the two lenses of a Galilean telescope.

3. A laser light source comprising: a rod of laser material such as ruby; pumping means for attaining a population inversion in that rod; two reflectors arranged to define a resonant cavity about the said rod; means for rotating one of the said reflectors in phase with the laser pumping means so as to produce a sudden increase in the "Q" of the resonant cavity immediately after a maximum population inversion has been attained in the rod; and characterised by the disposition of the two lenses of Galilean afocal telescope in an optical path between the laser rod and the rotatable reflector.

4. A laser according to claim 3, in which the rotatable reflector has the form of a roof prism and in which the positive and negative optical surfaces of the Galilean telescope are formed on the roof prism and on the laser rod respectively.

5. A laser acording to claim 4, in which the telescope has an effective magnification of about 7.8 times.

6. A laser according to claim 3, in which: the negative lens of the Galilean telescope is formed at an end face of the laser rod; the positive lens of the said telescope is formed on the front face of a fixed erecting reflector such as a roof prism; and the said rotatable reflector is disposed in an optical path between the said two lenses.

7. A laser according to claim 6, in which the rotatable reflector takes the form of a prismatic block having at least four side faces.

8. A laser according to claim 7, in which the said prismatic block is mounted to rotate about its longitudinal axis.

9. A laser according to claim 7, in which the said block is so disposed with respect to the laser rod and the fixed erecting reflector that the light beam undergoes Brewster angle refraction at the two end faces of the block at the critical instants during each revolution when total internal reflection occurs at a side face of the block.

10. A laser according to claim 7, in which at least part of the optical power of the Galilean telescope system results from the formation of optical surfaces on the end faces of the said block.

References Cited

UNITED STATES PATENTS

| | | | |
|---|---|---|---|
| 3,274,512 | 9/1966 | Okaya | 331—94.5 |
| 3,281,712 | 10/1966 | Koester | 331—94.5 |
| 3,315,177 | 4/1967 | Benson | 331—94.5 |
| 3,388,343 | 6/1968 | White | 331—94.5 |
| 3,393,374 | 7/1968 | Krumboltz | 331—94.5 |
| 3,398,379 | 8/1968 | Sims et al. | 331—94.5 |

JOHN KOMINSKI, Primary Examiner

U.S. Cl. X.R.

350—285